Figure 1:
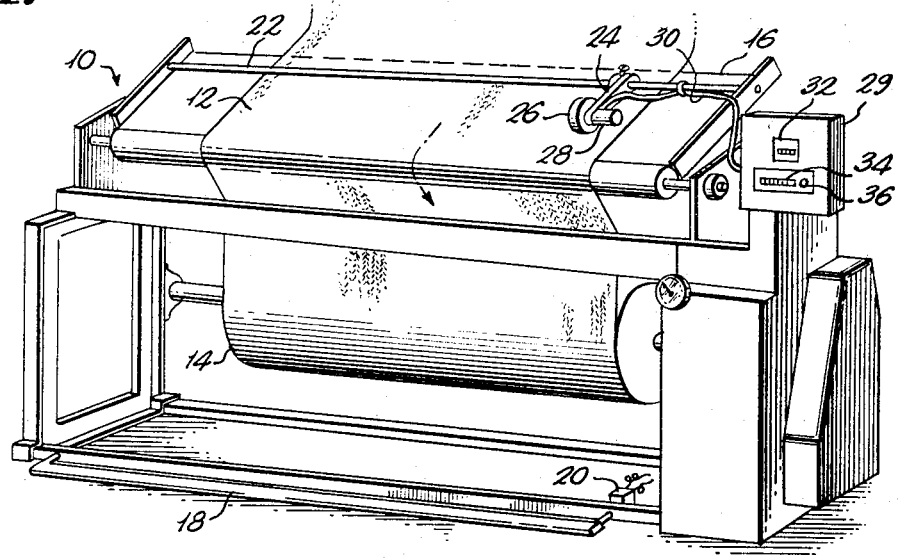

Nov. 5, 1968

M. F. O'BRIEN ET AL 3,409,762

PRODUCTION AND QUALITY CONTROL RECORDER
FOR TEXTILE MACHINERY
Filed Dec. 10, 1965

INVENTORS
Martin F. O'Brien &
Howard F. Moore

BY

ATTORNEY

3,409,762
PRODUCTION AND QUALITY CONTROL RECORDER FOR TEXTILE MACHINERY

Martin F. O'Brien and Howard F. Moore, Greenville, S.C., assignors to Frontier Electronics, Inc., Greenville, S.C., a corporation of South Carolina
Filed Dec. 10, 1965, Ser. No. 513,018
11 Claims. (Cl. 235—92)

This invention relates broadly to textile machinery, and more particularly to apparatus used in combination with such machinery for obtaining an automatic indication of production as well as quality control.

Under conventional practice, cloth inspectors in textile mills are paid by an hourly rate or by incentives based on production. Most mills utilize the hourly rate plan because the cost of obtaining continuous data for incentive rates by assigning frequency checkers to the machine can be prohibitive and it is felt that quality would be sacrificed if the only incentive was to inspect a greater number of yards of cloth. Incentive plans based on production are not always fair because cloth inspection involves a task where work is not directly related to yardage inspected; that is, when a great deal of mending is required, less yardage passes through the inspection operation. Also, the system of using average data from sampling frequency checks does not allow for short term variation from the average.

It is an object of the present invention, therefore, to provide electrical apparatus capable of accurately measuring the performance of operators of textile machinery from which a fair and accurate wage incentive system can be derived.

It is another object of the present invention to provide a relatively inexpensive electronic recorder system which will provide an accurate indication of the production of cloth inspectors, graders, menders and the like.

It is still a further object of the present invention to provide a recorder on inspection machines for textiles which automatically records the number of stops needed to make repairs on cloth under inspection and the total accumulated inspecting time of the inspector.

In accordance with the present invention, a means is provided for attaining continuous information on the exact amount of time the inspector spends in inspecting time and the amount of defects repaired over a predetermined length of time. Briefly, the subject invention comprises a non-coasting running time meter and an adjustable time delay counter controlled by a switch such as a relay which is activated by means of a cloth motion detector circuit mounted to the inspection machine. A cloth motion sensor forming a part of the motion detector circuit is in direct contact with the cloth being inspected. The time delay counter is utilized to count the number of repairs made with the delay being provided to render it impossible for the operator to cheat by recording on the counter a greater number of repairs than actually made. The non-coasting time meter includes a braking circuit so that it stops instantly after each stop, giving accurate and reliable information as to total running time of the machinery.

One type of apparatus utilized in conjunction with textile machinery for gaging production and quality control is disclosed in U.S. Patent 3,124,316, issued to Martin F. O'Brien et al., and assigned to the assignee of the present invention. The apparatus disclosed in the aforementioned patent comprises a low energy electronic counter system which enables the accurate counting of the number of knots tied manually by an operator of a yarn winder for yarn being wound from one package to another during normal operation of the machine. The system counts the number of tie-ups or starts during the operation of the winder, as well as the number of knots tied due to yarn breakage which automatically stops the machine or a unit of the machine. The system also has a built-in time delay factor which eliminates the possibility of the operator recording a greater number of knots than those actually tied.

Figure 2:
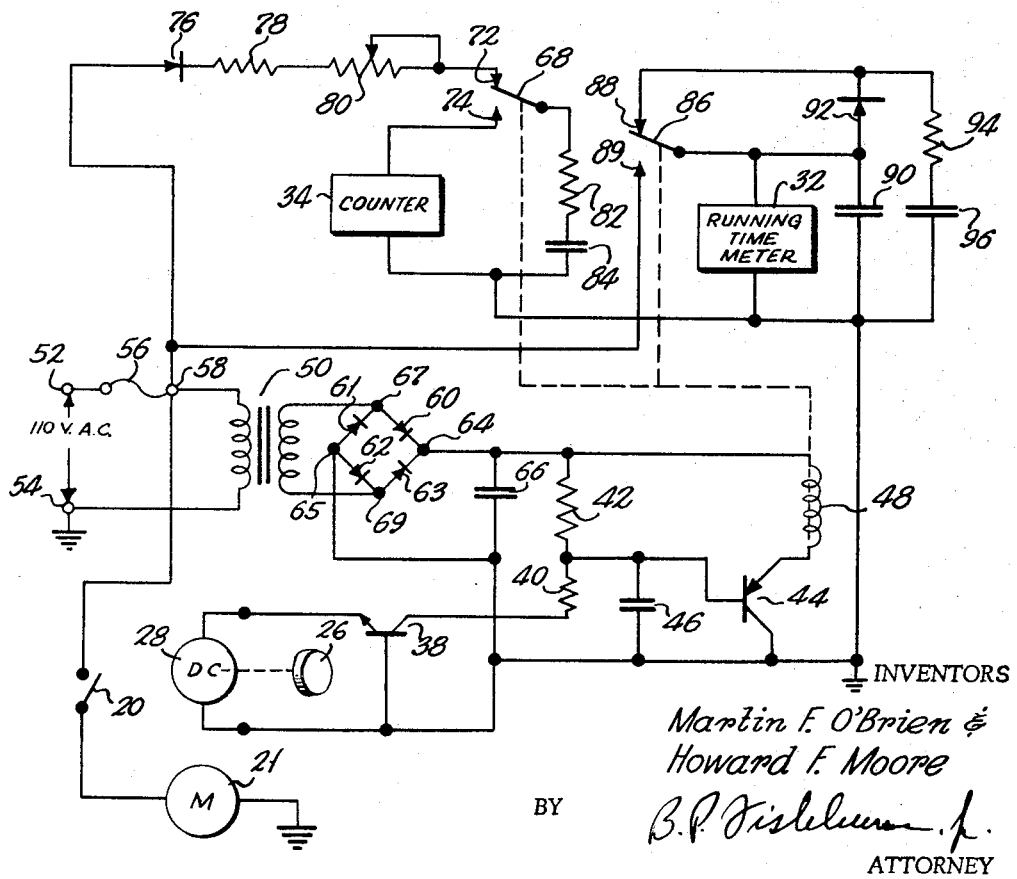

Other objects and advantages of the present invention will be apparent as the following detailed description proceeds when read in conjunction with the following drawings, in which:

FIGURE 1 is a perspective view of the apparatus embodying the subject invention mounted on a textile machine; and FIGURE 2 is an electrical schematic diagram illustrative of the preferred embodiment of the invention.

Considering the invention in greater detail, reference is made to FIGURE 1 wherein reference numeral 10 designates generally, but not limited to, a conventional cloth room inspection machine adapted to translate cloth 12 wound onto a roll 14 moving downwardly over an inspection frame 16. A cloth inspector hereinafter referred to as an "operator" stands in front of the inspection machine and controls the operation of the machine 10 by means of a foot switch lever 18 mechanically connected to an electrical switch 20. The switch 20 in turn controls a drive motor, not shown, which effects the movement of the cloth 12 over the inspection frame 16.

Transverse to and above the frame 16 is mounted a metal rod 22 to which is attached, intermediate the ends thereof, a cloth motion sensor 26 comprising a rotary follower mounted on the arm 24. Coupled to the sensor 26 through the arm 24 is an electrical generator 28 which is driven by the rotary motion of the sensor so as to produce an electrical signal voltage. The sensor 26 is adapted to be positioned over the table 16 such that it is in direct contact with the cloth 12 and that the translational movement of the cloth 12 is imparted thereto. The generator 28 which may be, for example, a small DC tachometer generator, is coupled to the recorder 29 by means of the electrical wiring shown as reference numeral 30. The recorder 29 is shown including a running time meter 32, a counter 34 and a key reset means 36 mounted on the front cover. The running time meter 32 contains a non-coasting feature which will be explained in detail subsequently and the counter 34 is part of a circuit which contains adjustable electronic time delay for preventing non-repair stops from being counted. The key reset 36 provides flexibility in resetting of the counter and the running time meter 32.

Briefly, the operator actuates switch 20 by means of the foot switch lever 18 to make the cloth 12 move down over the inspection frame 16. As a defect comes into view, the operator takes her foot off of the lever 18, the cloth 12 stops and the repair is made. Having made the repair, the operator steps on the lever 18 and continues inspecting the cloth. The cloth motion sensor 26 actuated by movement of the cloth 12 down the frame drives the electrical generator 28 which in turn controls the circuitry, not shown, comprising the running time meter 32 and the counter 34. The counter 34 will be advanced one count when the operator restarts the machine 10. Sometimes the operator stops the cloth 12 for a few seconds to examine the cloth by running her hand across it and then starts the cloth 12 moving again without repairing a defect. It is desired that such a stop should not be counted by means of the counter 34, hence the counter 34 is equipped with a variable time delay which blocks out the counting of stops which are shorter than a predetermined minimum time. The cloth motion detector circuit including the sensor 26 is utilized to overcome the possibility of obtaining unreliable data due to jogging and coasting of the cloth 12 when the operator removes her foot from the foot switch lever 18.

The standard running time meter 34 inherently coasts and drifts after each stop. This coasting over a large number of stops introduces an error in the data which would have to be compensated for where the data is used to establish a basis for an incentive wage plan. To correct this, a braking circuit, not shown but explained more fully hereinafter, is incorporated with the time meter 32 so that it stops instantly after each stop, giving accurate and reliable production information.

With apparatus as disclosed in FIGURE 1, it is possible to obtain accurate information on every operator every day as to the number of defects in every yard of cloth, on every style, with the average time for repair being determined by the elapse time the operator has worked.

The electrical circuitry embodying the subject invention is shown in schematic form in FIGURE 2. Shown therein is a DC tachometer generator 28 mechanically connected to the rotary cloth motion sensor 26. One output terminal of the DC generator 28 is connected to a point of reference potential hereinafter referred to as "ground" while the other output terminal is connected to the emitter of transistor 38 which has its base connected to ground, thereby defining a grounded base circuit configuration. The collector of transistor 38 is directly connected to resistor 40 which in turn is connected to resistor 42. The common connection between resistors 40 and 42 is directly connected to the base of transistor 44 which has its collector returned to ground, defining an emitter follower circuit configuration. Coupled across the base electrode of transistor 44 to ground is capacitor 46. An electrical relay coil 48 is coupled between the emitter of transistor 44 and the terminal 64.

The transistors 38 and 44 are powered from a DC voltage appearing at terminal 64 as established by connecting a step-down transformer 50 across a pair of input terminals 52 and 54 which in turn is adapted to be connected across a source of AC voltage, not shown. A fuse 56 is connected between input terminal 52 and one terminal of the primary winding of transformer 50. The secondary winding of transformer 50 is directly connected to full wave rectifier comprising diodes 60, 61, 62 and 63 across terminals 67 and 69. Terminal 65 is returned to ground. A capacitor 66 providing a filtering action is connected from terminal 64 to ground.

When motion of the cloth 12, as shown in FIGURE 1, is detected by means of the motion sensor 26, the DC generator 28 applies a negative voltage to the emitter of transistor 38 driving it into a state of conduction. The resistors 40 and 42 comprise the load for transistor 38 and as transistor 38 becomes conductive, a voltage drop appears across resistor 42. This drop is coupled to the base of transistor 44 causing it to become conductive also and in so doing draws current sufficient to energize double throw relay and is mechanically coupled to the relay coil 48. The relay coil 48 is part of a double pole, armatures 68 and 86.
68 and 86.

The variable time delay counter circuit including the counter 34 is shown comprising a diode 76 and a variable resistance-capacitance charging circuit coupled together through a first set of relay contacts 72 and 74 and the armature 68. In greater detail, a half-way rectifier comprising a single diode 76 has its cathode electrode connected to terminal 58 which is coupled to the input terminal 52 through the fuse 56. The anode electrode of diode 76 is connected to a fixed resistor 78 which in turn is coupled to a variable resistor 80. The variable resistor 80 is coupled to another fixed resistor 82 through the normally closed contact 72 and the armature 68. Coupled to fixed resistor 82 is capacitor 84 which is returned to ground. Across the normally open contact 74 and ground is connected the electrical counter 34.

The time delay circuit operates such that when the motion detector circuit including sensor 26 and DC generator 28 energizes relay coil 48, the armature 68 will make contact with the normally open contact 74. When the operator stops the machine by means of the foot operated switch 20, shown in FIGURE 1, the motion detector circuit will de-energize the relay coil 48 and the armature 68 will make contact with the contact 72. When de-energized, a half-wave rectified DC current will now have a tendency to charge the capacitor 84 with the charge accumulated being determined by the RC time constant as determined by the resistors 78, 80, 82 and capacitor 84. The variable resistor 80 is chosen to be of such a value that it substantially controls the aforesaid RC time constant. When the operator again starts inspecting the cloth, the relay coil 48 will be energized, coupling the capacitor 84 across the counter 34. If the stop was longer than a predetermined time as set by the resistor 80, the capacitor 84 will be sufficiently charged to a voltage sufficient to advance the counter 34 by one count. On the other hand, a momentary stoppage will not advance the counter 34 because the voltage across the capacitor will be of insufficient magnitude to advance the count but the charge thus accumulated on the capacitor 84 will nevertheless discharge through the counter and resistor 82. It should be borne in mind that during the ordinary running time of the machine 10, the counter 34 is connected across the capacitor 84 and the resistor 82 and it only is when stoppage occurs that the capacitor 84 will have an opportunity to charge.

The running time meter circuit including time meter 32 is comprised of a second set of relay contacts 88 and 89 and armature 86, a diode 92 and a resistance-capacitance charging circuit including resistor 94 and capacitor 96. In greater detail, contact 89 is connected to terminal 58 which is coupled to the input terminal 52 through the fuse 56. The armature 86 is connected to one side of the running time meter 32 and capacitor 90. Coupled directly across the relay contact 88 and the armature 86 and one side of the capacitor 90 is the diode 92. Coupled to the anode of diode 92 is the resistance 94 coupled directly to the capacitor 96. The opposite side of the capacitor 96 is connected directly to ground.

In operation, the relay contacts associated with the running time meter are shown in a de-energized relay position. As before, when the operator activates the machinery 10 by means of the switch 20, the relay coil 48 is energized, pulling the armature 86 into contact with contact 89. This connects the running time meter 32 across the AC voltage applied across input terminals 52 and 54. At the same time, the AC voltage is half-wave rectified through the diode 92 to charge the capacitor 96 through the resistance-capacitance combination of resistor 94 and capacitor 96. When the operator stops the machine, the relay coil 48 will be de-energized and armature 86 will make with contact 88 at which time, the resistance-capacitance combination of resistor 94 and capacitor 96 will be placed across the running time meter 32 such that the capacitor 96 will discharge through the running time meter 32 causing it to brake immediately. The purpose of the capacitor 90 coupled across the running time meter 32 is merely to reduce the peak level of AC pulses applied to the running time meter 32.

In summation, therefore, the operator is adapted to control the unwinding of the cloth 12 running over the frame 16 onto the spool 14 by means of the foot operated switch 20 which controls the electrical drive motor 21. Motion of the cloth is detected by the motion detector comprising a rotary sensor 26 coupled to a DC tachometer generator 28 which in turn triggers a transistor circuit into conduction for activating the relay coil 48. The relay coil 48, when activated, couples the capacitor 84 across the counter 34 as well as coupling the elapsed running time meter 32 to the AC voltage applied across input terminals 52 and 54. At the same time, a charge is placed on capacitor 96. In the event that the operator stops the machinery by releasing the switch 20, the relay coil 48 is deenergized and capacitor 84 is adapted to be charged from the AC voltage applied across input terminals 52 and 54. At the same time, the running time meter is coupled to the capacitor 96 whereupon an immediate braking action takes place. If the stoppage continues for a predetermined time delay which is adjustable by means of the variable resistor 80, the capacitor 84 accumulates sufficient charge such that when the operator again starts the machinery, the counter 34 will advance by one count.

What has been shown and described, therefore, is a wage incentive recorder system for measuring the actual work performed by cloth inspectors, graders and menders so that a fair and equitable method of determining wages results as well as providing an accurate indication of production and quality control. While what has been shown and described is at present considered to be the preferred embodiment of the invention, modifications thereto may readily occur to those skilled in the art. For example, while the subject invention has been described with respect to its usage on a cloth inspection machine, it should be pointed out that similar apparatus can be used for pin drafting, warping, drawing, tufting and dyeing and finishing equipment. It is not desired, therefore, that the invention be limited to the specific arrangement shown and described, but it is to be understood that all equivalents, alterations and modifications within the scope of the present invention are herein meant to be included.

We claim as our invention:

1. A wage incentive recorder system for textile machinery comprising in combination: switch means responsive to the operating condition of said textile machinery so as to be in a first state during the "off" condition of said machinery and in a second state during the "on" condition of said machinery; input terminals adapted to be coupled to a voltage source; a delay counter circuit coupled to said input terminals through said switch means, said counter circuit including step counter means and a variable resistance-capacitance charging circuit having a predetermined time constant coupled together by said switch means such that the capacitance of said charging circuit is connected to said input terminals so as to receive a charge from said voltage source when said switch means is in said first state, said capacitance being coupled across said step counter when said switch means is in said second state and discharging through said step counter means and advancing it one count during said second state providing said first state exists for a prior predetermined time as determined by said time constant of said resistance-capacitance charging circuit; and a running time meter circuit including a running time meter and a second resistance-capacitance charging circuit coupled together by said switch means, such that both said running time meter and said second charging circuit are coupled to said input terminals during said second state of said switch means so that said time meter is operative and the capacitance of said second resistance-capacitance charging circuit receives a charge from said voltage source, and whereupon said second resistance-capacitance charging circuit is directly coupled across said time meter by said switch means during said first state to brake said time meter thereby preventing any coasting thereof.

2. A recorder system for a textile machine adapted to move cloth therethrough for measuring production on which to base a wage incentive system comprising in combination: a cloth motion detector circuit mounted on said textile machine and being in contact with said cloth for producing an electrical signal voltage only when said cloth is moving through said machine; electrical switch means adapted to be operated to switch from a first operating state to a second operating state; electronic circuit means coupled between said cloth motion detector circuit and said switch means for producing a switching voltage capable of operating said switch means from said first to said second operating state in response to said electrical signal voltage produced by said motion detector circuit; input terminals adapted to be coupled to a voltage source; a delay counter circuit including a step counter and a capacitor charging circuit coupled together by said switch means, said switch means being operable to couple said input terminals to said capacitor charging circuit when in said first operating state, but coupling said capacitor charging circuit across said step counter in said second operating state and advancing the count of said step counter only after having remained in said first operating state for a predetermined length of time; a running time meter circuit, including a time meter and a braking circuit having a second capacitor charging circuit, coupled to said switch means, said switch means being operable to couple said time meter and said braking circuit to said input terminals when said switch means is in said second operating state thereby rendering said time meter operative and charging said second charging circuit, but coupling said second charging circuit across said time meter when said switch means is in said first operating state providing a braking action for said time meter by the resulting discharge of said second charging circuit therethrough.

3. The invention as defined in claim 2, wherein said motion detector circuit comprises motion sensor means mounted on said textile machine being in contact with said cloth and driven by the motion of said cloth; electrical generator means coupled to said motion sensor means for producing said electrical signal voltage in accordance with the movement of said cloth under said motion sensor; and electrical circuit means coupling said signal voltage to said aforementioned electronic circuit means.

4. Apparatus as defined in claim 2, wherein said motion detector circuit comprises a rotary motion sensor mounted on said textile machine and being in contact with said cloth so as to be driven by the motion thereof; a DC electrical generator mechanically coupled to said rotary sensor producing a DC electrical signal in accordance with said movement of said cloth; and electrical circuit means coupling said DC voltage to said aforementioned electronic circuit means.

5. Apparatus as defined in claim 2, wherein said electrical switch means comprises an electrical relay having at least a first and a second set of electrical contacts, and circuit means selectively coupling said first set of electrical contacts to said delay counter circuit and said second set of electrical contacts to said running time meter circuit.

6. Apparatus as defined in claim 2, wherein said electronic circuit means comprises transformer means coupled to said input terminals for stepping down a voltage applied thereto; rectifier means coupled to said transformer means for providing a DC power supply voltage; transistor means coupled to said rectifier means being powered by said DC power supply voltage; circuit means coupling said electrical signal voltage from said motion detector, said electrical signal voltage from said motion detector rendering said transistor means conductive thereby; and circuit means coupling said transistor means to said electrical switch means such that said switch means is driven from said first to said second operating state.

7. Apparatus as defined in claim 2, wherein said step counter comprises an electrically operated step counter adapted to operate when an electrical signal of predetermined magnitude is applied thereto and said capacitor charging circuit comprises a series resistance-capacitance circuit having a predetermined RC time constant coupled to said input terminals by means of said switch means when said switch means is in said first operating state, with the capacitance of said resistance-capacitance circuit being coupled across said counter during said second operating state of said switch means advancing the count of said counter when said first operating state exists for said predetermined RC time at which time said capacitance will have charged to the predetermined magnitude necessary to operate said counter.

8. Apparatus as defined in claim 2, wherein said electrical switch means comprises a multipole, multiposition relay having at least a first and a second set of contacts and a relay coil, circuit means for coupling said relay coil to said electronic circuit means coupled to said cloth motion detector circuit; said delay counter circuit comprises an electrical counter and a variable resistance-capacitance charging circuit having a predetermined time constant, said counter and said charging circuit being coupled together by said first set of relay contacts such that in said first operating state thereof the capacitance of said charging circuit is coupled to said input terminals for being charged from a voltage source adapted to be connected thereto, however said first set of relay contacts coupling said counter across said capacitance during said second operating state and advancing said counter when said first operating state has existed for a predetermined time as determined by said time constant of said variable resistance-capacitance charging circuit; and said running time meter circuit comprises an electrical time meter and said braking circuit including a second resistance-capacitance charging circuit, being coupled together by said second set of contacts such that said time meter and said second resistance-capacitance charging circuit are connected to said input terminals during said second operating state, however, said second set of relay contacts in said first operating state coupling said capacitance of said second resistance-capacitance charging circuit across said running time meter for providing a braking effect for said time meter.

9. Apparatus as defined in claim 2, wherein said electronic circuit means coupled between said cloth motion detector and said switch means includes a step-down transformer coupled to said input terminals, rectifier means coupled to said step-down transformer for providing a DC power supply voltage; a first and a second transistor coupled to said rectifier means for receiving said DC power supply voltage therefrom; circuit means coupling said cloth motion detector circuit to said first transistor which is rendered conductive when said electrical signal voltage is applied thereto; circuit means coupling said second transistor to said switch means; a resistance-capacitance coupling circuit connected between said first and said second transistor for translating a signal from said first transistor to said second transistor rendering said second transistor conductive when said first transistor becomes conductive for activating said switch means.

10. Apparatus as defined in claim 9, wherein said switch means comprises a multipole multiposition relay having a first and a second set of contacts; circuit means coupling said first set of contacts to said delay counter circuit and advancing the count of said counter if said first operating state persists for a predetermined length of time after said second operating state has occurred at least once; and circuit means coupling said second set of relay contacts to said running time meter circuit including said braking circuit such that said second set of relay contacts couples the running time meter and said braking circuit to said input terminals during said second operating state but coupling said braking circuit across said time meter in said first operating state for providing a braking effect to said time meter.

11. A recorder system for a textile inspecting machine having cloth moving over an inspection frame comprising in combination: cloth motion detection apparatus mounted above said inspection frame and including a rotary cloth motion sensor in contact with said cloth and electrical generator means mechanically connected to said sensor generating an electrical signal voltage in response to the movement of said cloth; electrical switch means adapted to be operated to switch from a first operating state to a second operating state; electronic circuit means coupled between said electrical generator means and said switch means producing a switching voltage capable for operating said switch means from said first to said second operating state; input terminals adapted to be coupled to a voltage source; a delay counter circuit including a step counter and a capacitor charging circuit coupled together by said switch means, said switch means being operable to couple said input terminals to said capacitor charging circuit when in said first operating state, but coupling said capacitor charging circuit across said step counter in said second operating state and advancing the count of said step counter only after having remained in said first operating state for a predetermined length of time; a running time meter circuit, including a time meter and a braking circuit having a second capacitor charging circuit, coupled to said switch means, said switch means being operable to couple said time meter and said braking circuit to said input terminals when said switch means is in said second operating state thereby rendering said time meter operative and charging said second charging circuit, but coupling said second charging circuit across said time meter when said switch means is in said first operating state providing a braking action for said time meter by the resulting discharge of said second charging circuit therethrough.

References Cited

UNITED STATES PATENTS

| | | | |
|---|---|---|---|
| 3,044,699 | 7/1962 | Smith | 235—92 |
| 3,124,316 | 3/1964 | O'Brien | 235—92 |

MAYNARD R. WILBUR, *Primary Examiner.*

G. J. MAIER, *Assistant Examiner.*